United States Patent [19]

Shibata

[11] Patent Number: 5,085,461
[45] Date of Patent: Feb. 4, 1992

[54] AIR BAG MOUNT DEVICE FOR STEERING WHEEL INCLUDING CONTROL SWITCHES

[75] Inventor: Keiichiro Shibata, Higashihiroshima, Japan

[73] Assignee: Mazda Motor Corporation, Hiroshima, Japan

[21] Appl. No.: 497,854

[22] Filed: Mar. 23, 1990

[30] Foreign Application Priority Data

Mar. 24, 1989 [JP] Japan .................................. 1-72626

[51] Int. Cl.⁵ ............................................. B60R 21/22
[52] U.S. Cl. .................................... 280/731; 200/61.54
[58] Field of Search ............... 280/728, 743, 731, 735; 74/552; 200/61.54

[56] References Cited

U.S. PATENT DOCUMENTS

| | | | |
|---|---|---|---|
| 4,148,503 | 4/1979 | Shiratori | 280/731 |
| 4,325,568 | 4/1982 | Clark | 280/731 |
| 4,638,131 | 1/1987 | Kidd et al. | 200/61.55 |
| 4,934,735 | 6/1990 | Embach | 280/731 |

FOREIGN PATENT DOCUMENTS 122754 5/1989 Japan .................................. 280/743

Primary Examiner—Charles A. Marmor
Assistant Examiner—Karin Tyson
Attorney, Agent, or Firm—Fleit, Jacobson, Cohn, Price, Holman & Stern

[57] ABSTRACT

An air bag mount device for mounting an air bag unit on a steering wheel device comprises an inflatuble air bag body in the air bag unit, an air bag cover provided in the air bag unit for covering the air bag body, a bag storing portion provided in the air bag unit for receiving the air bag body, and a control switch for controlling accessories mounted on a vehicle. The air bag cover is formed with a breakable split line, along which the air bag cover is split to form an opening through which the air bag body is inflated. The control switch is arranged on the air bag cover outside of opposite ends of the split line so as to be kept from being influenced by breaking of the air bag cover and the inflation of the air bag.

11 Claims, 6 Drawing Sheets

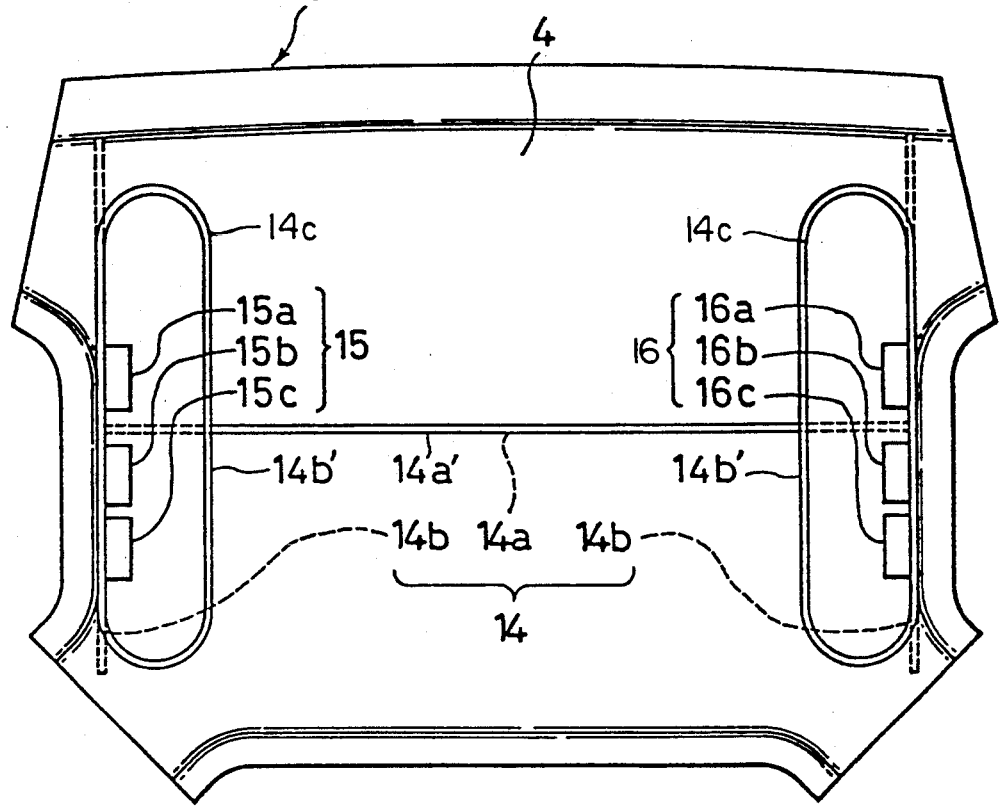
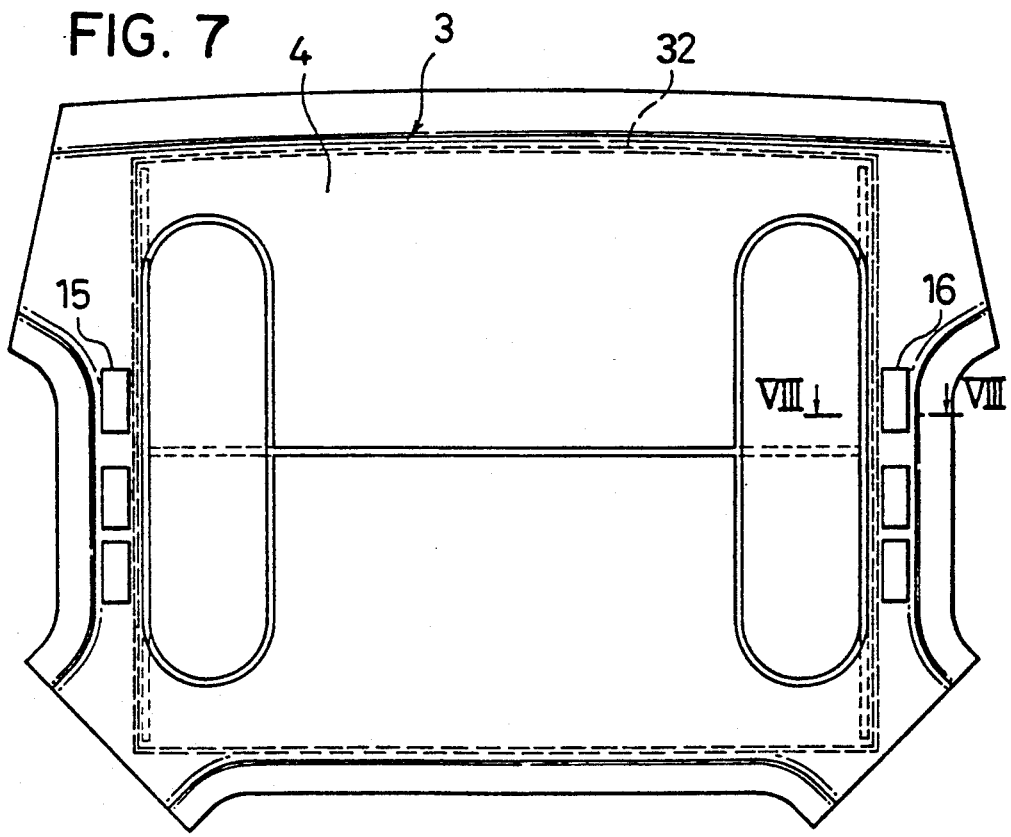

AIR BAG MOUNT DEVICE FOR STEERING WHEEL INCLUDING CONTROL SWITCHES

BACKGROUND OF THE INVENTION

1. Field of the Invention

The present invention relates to an air bag unit for an automotive vehicle of protecting a passenger in a seat in case of collision of the vehicle, and, more particularly, to a unique arrangement of an air bag mount device for mounting the air bag unit and control switches for controlling accessories mounted on the vehicle.

2. Description of the Prior Art

It is known, in a vehicle having an air bag unit, to have the air bag unit mounted on a steering wheel device. The air bag, unit is provided with an air bag which is inflated by an inflater therein, to form an air cushion between a driver and the steering wheel in case of a collision. In this type of air bag unit, the air bag is covered with a bag cover having a breakable split line, by which the bag cover is split, to form an opening through which the air bag can be inflated outwardly.

It has been proposed to arrange some control switches on the steering wheel device for controlling various accessories mounted on the vehicle, such as an air conditioner and an audio device such as a radio. U.S. Pat. No. 3,819,205 disclosed a steering wheel device in which a control switch is arranged on a spoke portion of the steering wheel device with the air bag unit.

It should however, be noted that the spoke portion has insufficient space in which to arrange many switches. When the switches are arranged at a hub portion of the steering wheel portion, the switches may interfere with the inflating operation of the air bag, or the inflating operation may damage the switches.

SUMMARY OF THE INVENTION

It is, therefore, an object of the present invention to provide an air bag mount device by which a control switch can be arranged on a steering wheel device conveniently.

It is a further object of the present invention to provide an air bag mount device on the steering wheel device without interfering with the control switch.

It is still another object of the present invention to provide an air bag mount device in which the air bag can be inflated without damaging the control switch in case of a collision.

The above and other objects of the invention can be accomplished by an air bag mount device for mounting an air bag unit on a steering wheel device comprising an air bag body in the air bag unit to be inflated, an air bag cover provided in the air bag unit for covering the air bag body, and a bag storing portion provided in the air bag unit for receiving the air bag body. The air bag cover is formed with a breakable split line, by which the air bag cover is split, to form an opening for the inflating air bag body, and control switch means for controlling accessories mounted on a vehicle. The control switch means is arranged on the air bag cover outside of opposite ends of the split line.

According to the above features of the present invention, where the air bag body is inflated, in case of a collision of the vehicle, the switch is not damaged, because the switch is located outside of the split line which forms the opening for the air bag body inflating.

In another aspect of the present invention, the control switch means is arranged on the air bag cover at opposite sides of the split line so that the split line can be elongated to facilitate the inflation of the air bag.

In another preferred embodiment, wall means is provided for partitioning the control switch means from the air bag body so that the switch means can be kept from being influenced by the breaking of the air bag cover and the inflating movement of the air bag.

The above and other features of the present invention will be apparent from the following descriptions making reference to the accompanying drawings.

BRIEF DESCRIPTION OF THE DRAWINGS

FIG. 6 is a plan view of an air bag mount device in accordance with another embodiment;

FIG. 7 is a plan view of an air bag mount device in accordance with still another embodiment;

DESCRIPTION OF THE PREFERRED EMBODIMENTS

Figure 1:
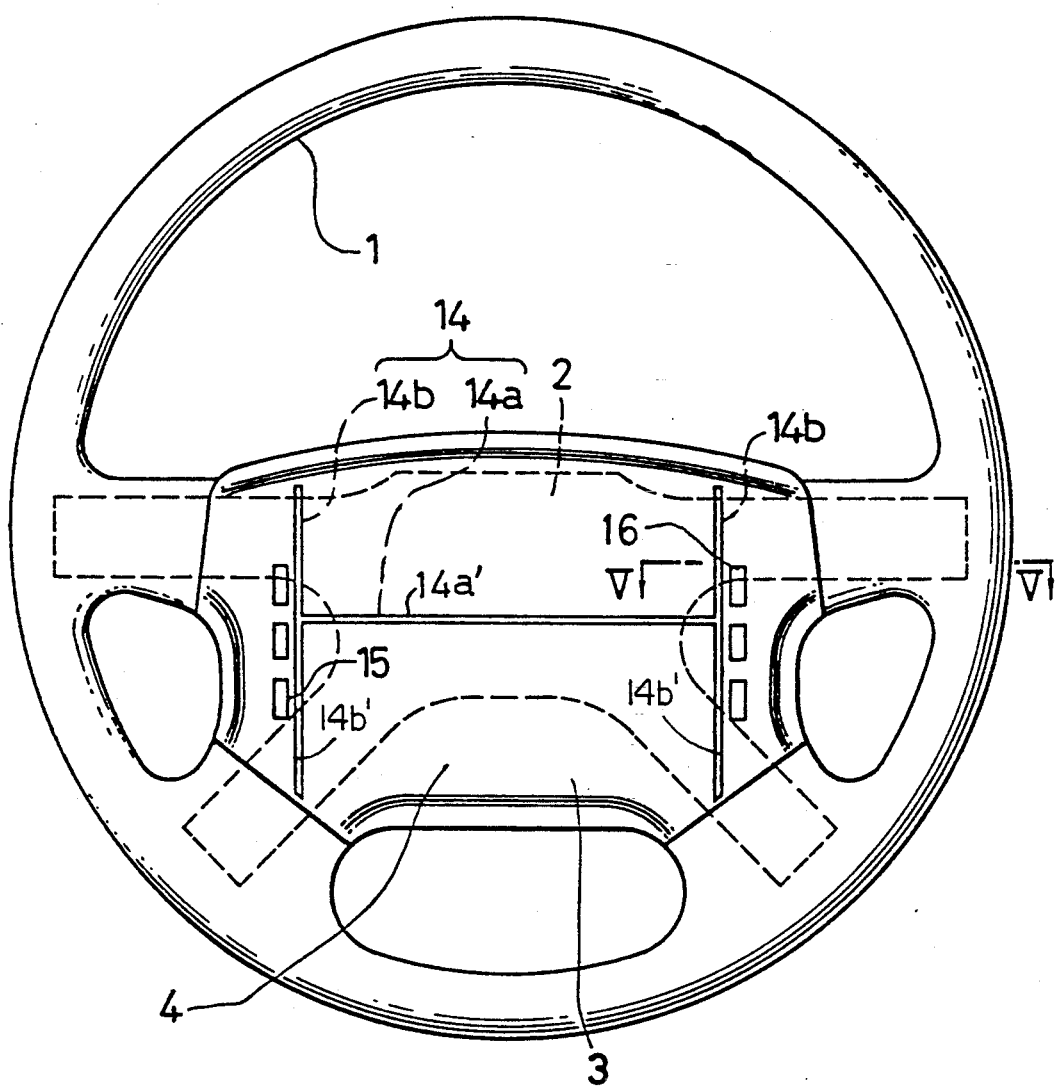
FIG. 1 is a front view of a steering wheel device in which an air bag unit in accordance with the present invention is mounted.
Figure 2:
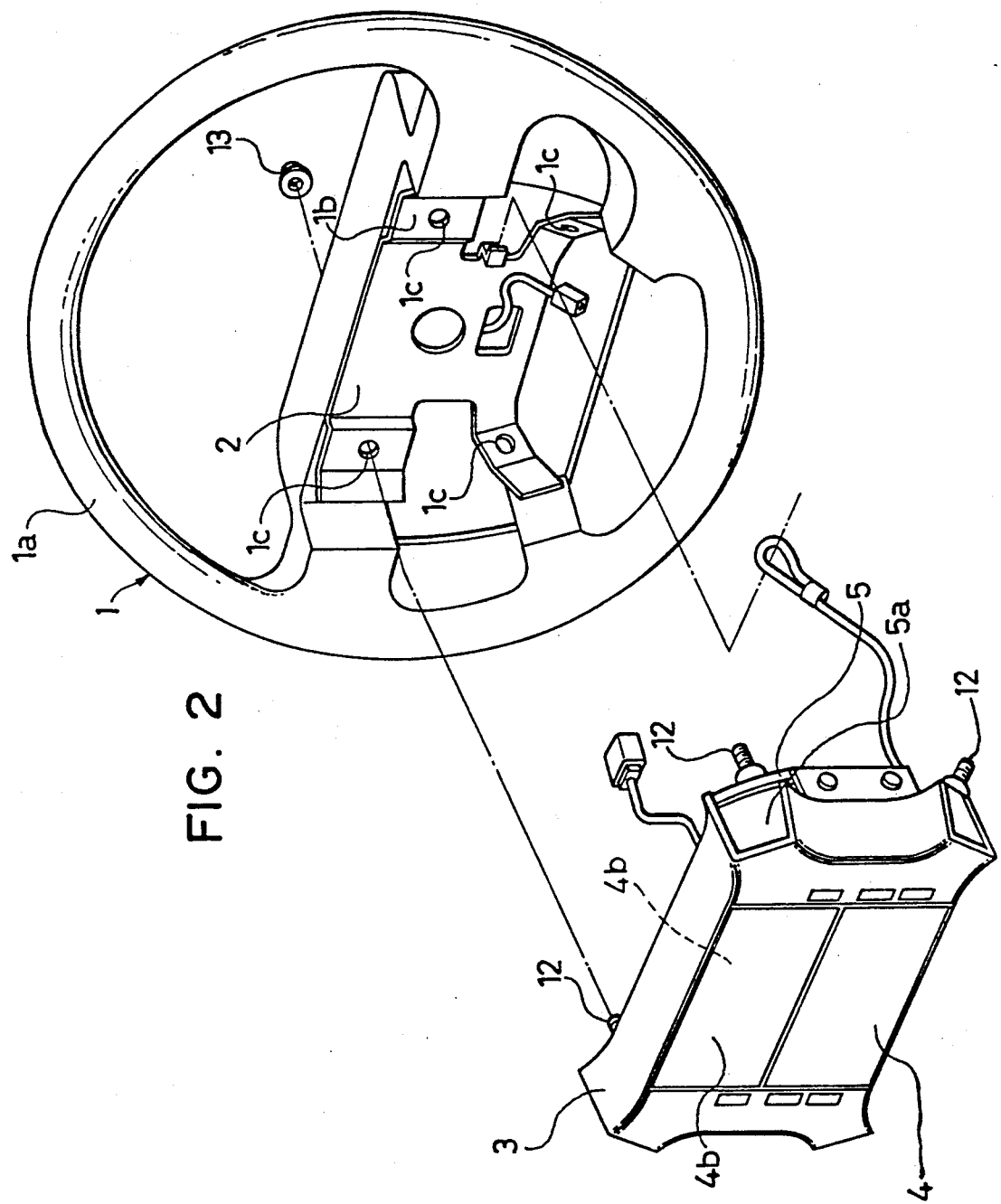
FIG. 2 is an explosive and perspective view showing the air bag unit removed from the steering wheel device.

Referring to the drawings, and specifically to FIGS. 1 through 5, there is shown an air bag mounted device in accordance with a preferred embodiment of the present invention. As shown in FIGS. 1 and 2, a steering wheel device 1 is provided with an air bag unit 3 on a wheel hub portion 2 thereof. The air bag unit 3 is provided with an air bag cover 4 of a box-like configuration open to the wheel hub portion. An inflater unit 5 is attached on the back side of the air bag cover 4. An air bag storing section 5a is provided between the air bag cover 4 and the inflater unit 5.

An air bag body 7 is folded and received in the air bag storing section 5a.

Figure 3:
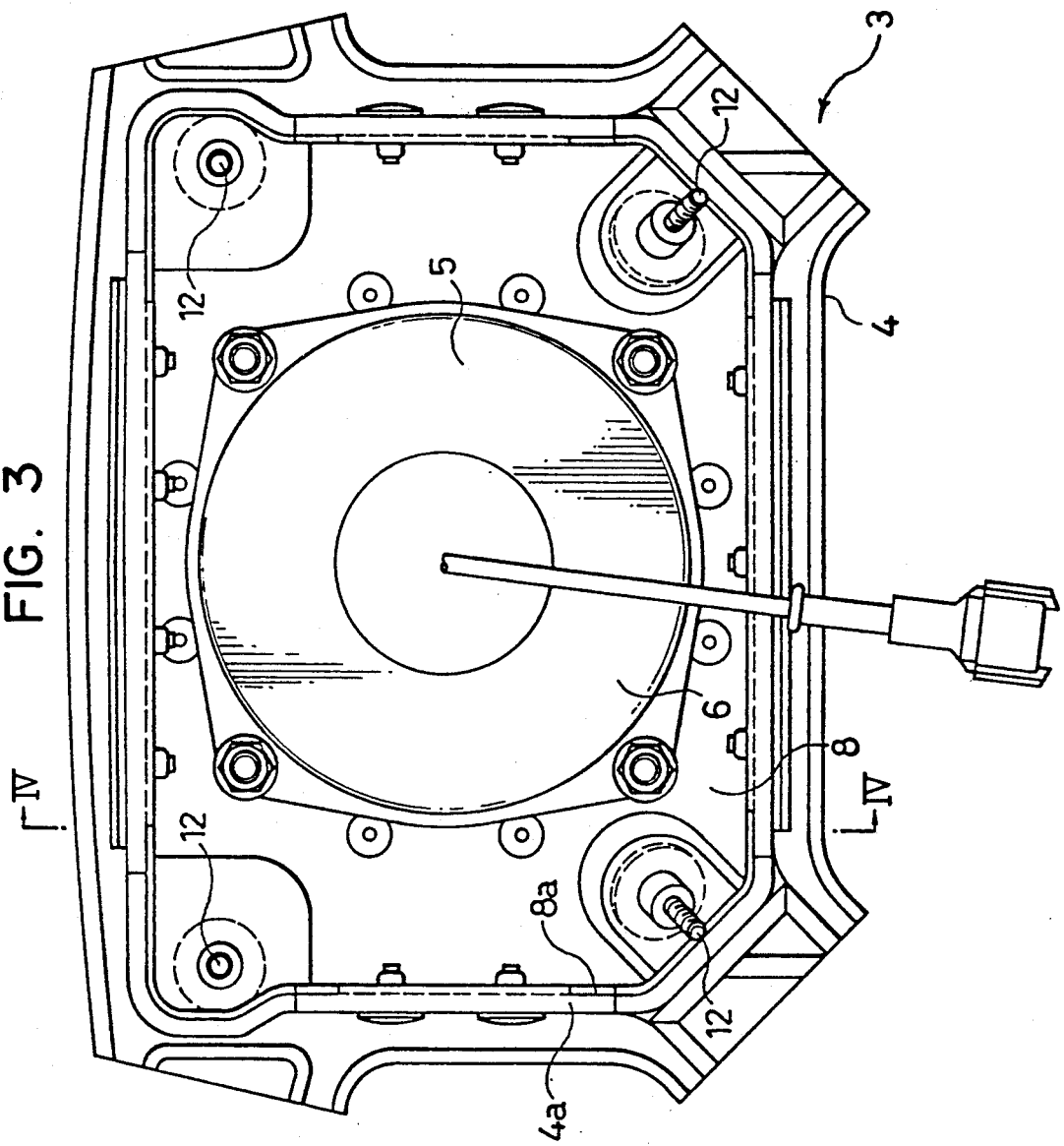
FIG. 3 is a back side view of an air bag unit of FIG. 1.
Figure 4:
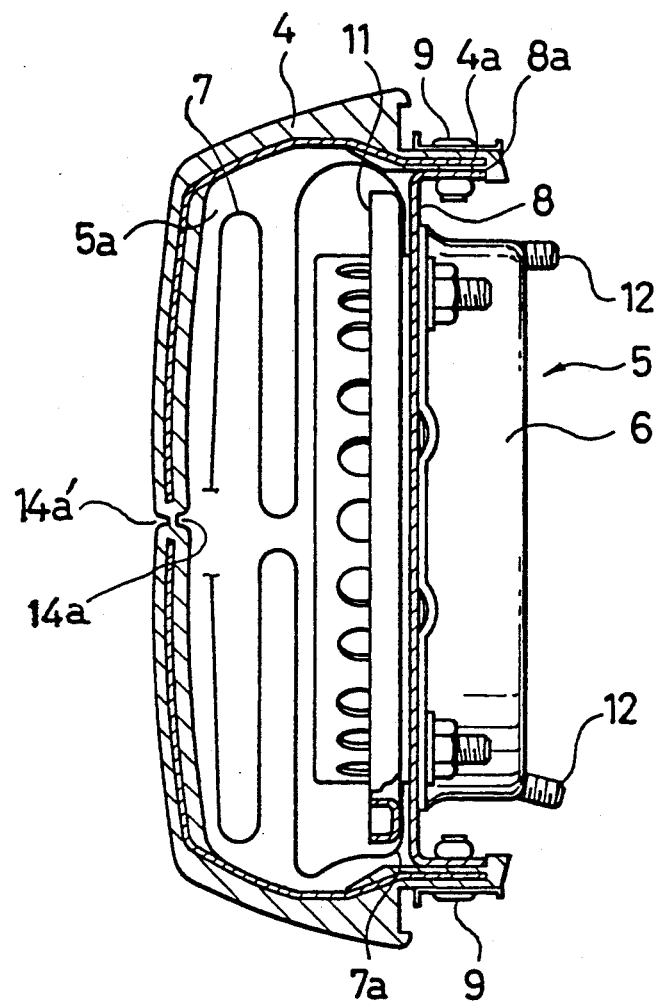
FIG. 4 is a sectional view as seen along a line IV—IV in FIG. 3.

FIG. 3 shows the back side of the air bag unit 3. FIG. 4 shows a sectional view of the air. bag unit 3. The air bag cover 4 is made of a reinforced fabric having a core material. The inflator. unit 5 is provided with a main body 6 of a disc-like configuration and a base plate 8 on which the main body 6 is mounted. The base plate 8 is formed with an annular flange portion 8a at a peripheral edge portion. The flange portion 8a faces to an inner surface 4a of the air bag cover 4. The air bag cover also has an outer surface 4b (See FIG. 2). The air bag cover 4 is fixed to the flange portion 8a of the base plate 8 through fasteners such as rivets 9 (See FIG. 4). The base plate 8 is provided with a retaining ring 11 of a U-shaped configuration, in section, on a front side. A free edge 7a of the air bag body 7 is fixed on the base plate 8 by means of the retaining ring 11 to provide an air tight condition between the base plate 8 and the air bag body 7. The inflater unit 5 is provided with fasteners 12, such as bolts, at four corners thereof. The bolts 12 are inserted into holes 1c provided on spokes 1b connecting the wheel hub portion 2 and the wheel ring 1a and joined with nuts 13 so that the air bag unit 3 is fixed to the steering wheel device 1.

As shown in FIG. 1, the air bag cover 4 is formed with split lines 14 which allow the air bag cover 4 to be split therethough by an inflating pressure of the air bag body 7. In this case, the air bag cover 4 is formed with a horizontal split line 14a extending substantially horizontally and a pair of vertical split lines 14b extending substantially vertically from opposite ends of the horizontal split line 14a, on a back surface 4a thereof and a split line 14a' and split lines 14b' on a front surface 4c corresponding to the lines 14a, 14b so that the split lines 14 provides a substantially horizontally elongated H-shaped conformation.

As shown in FIG. 4, the air bag cover 4 is reduced in thickness at the portion of the split lines 14 to permit the core material to be readily broken by the inflating movement of the air bag body in case of the collision. Outside of the split line 14b, 14b' on the air bag cover 4, are arranged control switches 15 for an air conditioner and control switches 16 for an audio device such as a radio.

Figure 5:
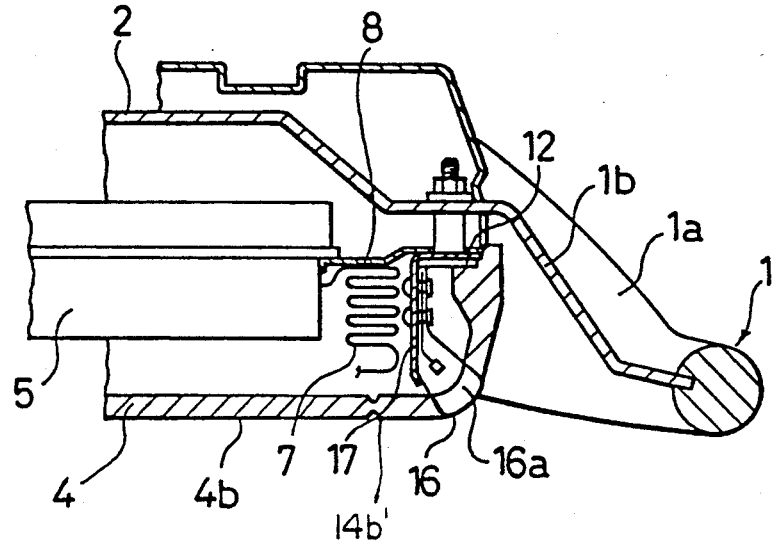
FIG. 5 is a partially sectional view as seen along a line V—V of FIG. 1.

FIG. 5 shows a sectional view in which the switches 16 are arranged. There is provided a plate-like bracket 17 for mounting the switches 16 between the bolt 12 and the base plate 8. The switches 16 are mounted on the bracket 17 at an opposite side of the air bag body 7. Operating portions of the switches 16 are projected from the front surface of the air bag cover 4 therethrough.

In operation, when a collision of vehicle occurs, the inflator 5 causes the air bag body 7 to be inflated. The air bag cover 4 is broken at the split lines 14 because of the inflating force of the air bag body 7. The air bag body 7 is further inflated through an opening formed by the break of the air bag cover 4. In this structure, since the control switches 15 and 16 are arranged outside of the split lines 14, the breakage of the air bag cover 4 and the inflating movement of the air bag does not influence the switches 16.

Hereinafter, there is described another preferred embodiment of the present invention.

FIG. 6 shows another arrangement of the split lines and the control switches.

According to the illustrated arrangement, switches 15a, 15b, 15c for the air conditioner and switches 16a, 16b and 16c for the audio device are arranged in oval defined by the split lines 14c at opposite ends of the vertical split lines 14b. The horizontal split line 14a extends between the switches 15a and 15b and between the switches 16a and 16b. As a result, a space for arranging the air bag body 7 can be increased without interfering with the switches 15 and 16.

Figure 8:
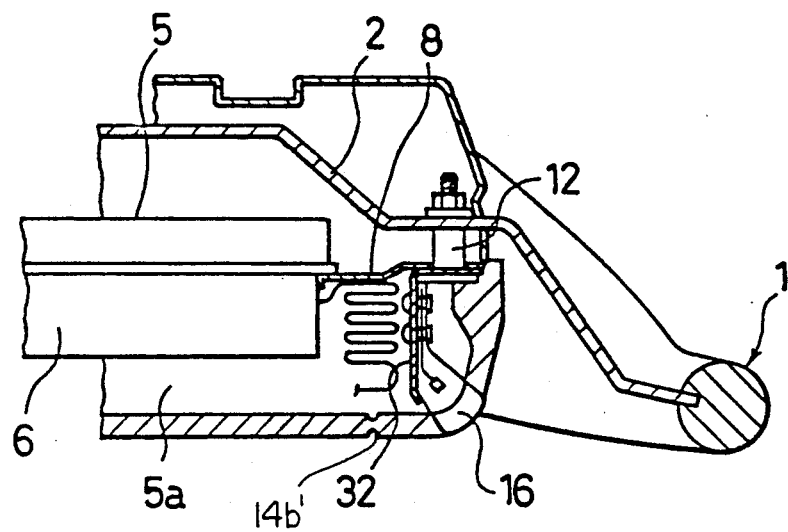
FIG. 8 is a sectional view as seen along a line VIII—VIII of FIG. 7.

Referring to FIGS. 7 and 8, still another embodiment is shown. As shown in FIG. 8, a wall member 32 extending vertically from the base plate 8 is disposed between the air bag body 7 and the switches 16 so that the switches 16 are partitioned by the wall member 32 from the air bag body 7. The wall member 32 is arranged to define a box-like space inside the switches 15 and 16. Thus, when the air bag body 7 is inflated, the inflating pressure of the air bag body 7 can be absorbed by the wall member 32 without damaging the switches 15 and 16. The split line 14 is located inside of an area in which the switches 15 and 16 are arranged so that breaking of the air bag cover 7 does not influence the switching 15 and 16.

Figure 9:
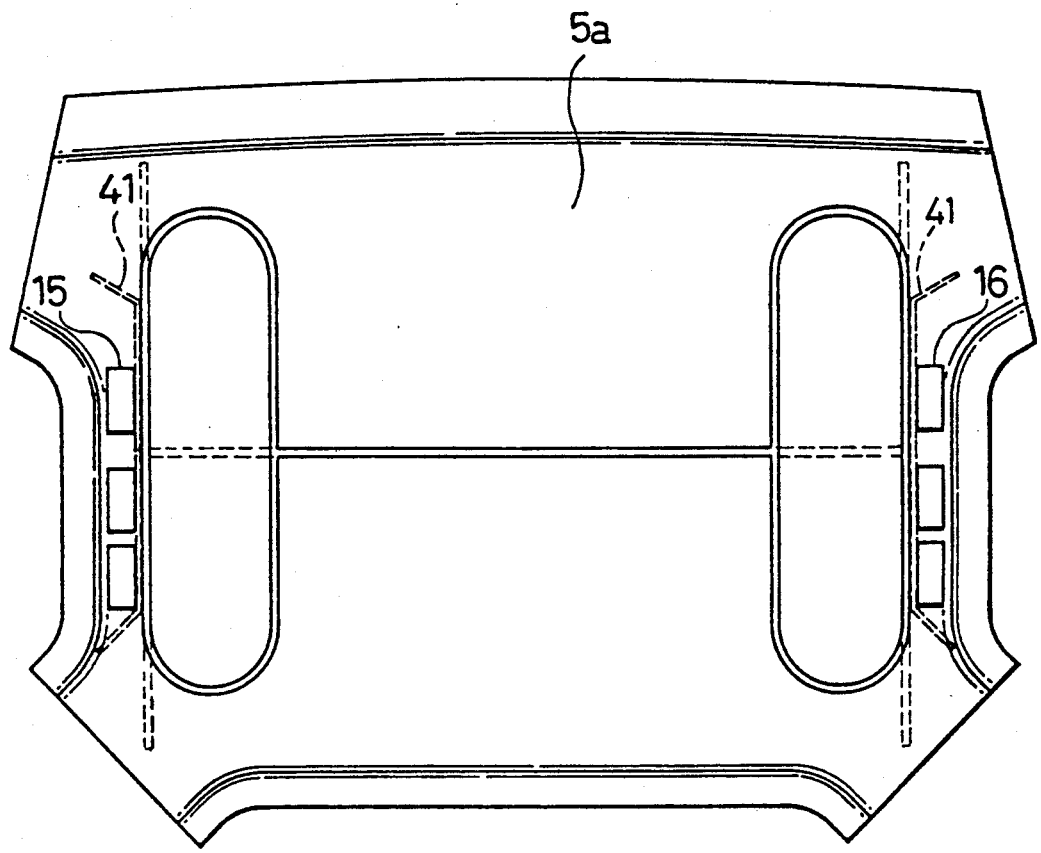
FIG. 9 is a plan view showing a back side of an air bag mount device in accordance with a still further embodiment of the present invention.

Referring to FIG. 9, there is shown a further embodiment of the present invention.

In this embodiment, a pair of wall members 41 are provided for partitioning the switches 15 and 16. The wall member 41 is arranged to surround the switches 15 and 16 to separate them from the air bag body 7. According to the illustrated embodiment, a receiving space in which the air bag body 7 can be arranged is increased.

It will be apparent that various modifications and improvements may be made based on the above descriptions by those skilled in the art without departing from the scope of the appended claims.

I claim:

1. An air bag mount device for mounting an air bag unit on a steering wheel device, comprising:
   an air bag body, which is to be inflated, in the air bag unit,
   an air bag cover provided in the air bag unit for covering the air bag body,
   a bag storing portion provided in the air bag unit for receiving the air bag body, and
   control switch means for controlling accessories mounted on a vehicle, wherein
   the air bag cover is formed with a breakable split line along which the air bag cover is split to form an opening through which the air bag body expands when it is inflated, and
   the control switch means is arranged in said bag storing portion, each control switch means including an operating portion located on the air bag cover outside of opposite ends of the breakable split line and laterally outwardly of said air bag body prior to inflation of said air bag body.

2. An air bag mount device as recited in claim 1 wherein the breakable split line comprises a horizontal split line extending substantially horizontally, and a pair of vertical split lines extending substantially vertically from opposite ends of the horizontal split line.

3. An air bag mount device as recited in claim 2, wherein the air bag cover is formed with a second breakable split line on a side of said air bag cover opposite said breakable split line, said second breakable split line comprising a second horizontal split line extending substantially horizontally and a pair of split lines of oval configuration disposed at opposite ends of said second horizontal split line.

4. An air bag mount device as recited in claim 1 and further comprising bracket means for mounting the control switch means at opposite sides of the air bag body.

5. An air bag mount device as recited in claim 3 wherein each of said operating portions of the control switch means is located in an area encircled by one of said pair of split lines of oval configuration.

6. An air bag mount device for mounting an air bag unit on a steering wheel device, comprising:
   an air bag body, which is to be inflated, in the air bag unit,
   an air bag cover provided in the air bag unit for covering the air bag body,
   a bag storing portion provided in the air bag unit for receiving the air bag body, and
   control switch means for controlling accessories mounted on a vehicle, wherein the air bag cover is formed with a breakable split line along which the air bag cover is split to form an opening through which the air bag body expands when it is inflated, the breakable split line comprises a horizontal split line extending substantially horizontally and a pair of vertical split lines extending substantially vertically from opposite ends of the horizontal split line, and the control switch means is arranged in said bag storing portion, each control switch means including an operating portion located on the air bag cover at opposite sides of the breakable split line.

7. An air bag mount device as recited in claim 6, wherein the air bag cover is formed with a second breakable split line on a side of said air bag cover opposite said breakable split line, said second breakable split line comprising a second horizontal split line extending substantially disposed at opposite ends of said second horizontal split line.

8. An air bag mount device as recited in claim 7, wherein each of the operating portions of the control switch means is arranged in an area defined by one of the pair of split lines of oval configuration.

9. An air bag mount device for mounting an air bag unit on a steering wheel device, comprising:

an air bag body, which is to be inflated, in the air bag unit, an air bag cover provided in the air bag unit for covering the air bag body, a bag storing portion provided in the air bag unit for receiving the air bag body, control switch means provided in said bag storing portion, each control switch means including an operating portion located on the air bag cover for controlling accessories mounted on a vehicle, and wall means for partitioning the control switch means from the air bag body, wherein the air bag cover is formed with a breakable split line along which the air bag cover is split to form an opening through which the air bag body expands when it is inflated, and the breakable split line comprises a horizontal split line extending substantially horizontally and a pair of vertical split lines extending substantially vertically from opposite ends of the horizontal split line.

10. An air bag mount device for mounting an air bag unit on a steering wheel device, comprising:

an air bag body, which is to be inflated, in the air bag unit, an air bag cover provided in the air bag unit for covering the air bag body, a bag storing portion provided in the air bag unit for receiving the air bag body, control switch means provided in said bag storing portion, each control switch means including an operating portion located on the air bag cover for controlling accessories mounted on a vehicle, and wall means for partitioning the control switch means from the air bag body, wherein the air bag cover is formed with a breakable split line along which the air bag cover is split to form an opening through which the air bag body expands when it is inflated, and the breakable split line comprises a horizontal split line extending substantially horizontally and a pair of split lines of oval configuration disposed at opposite ends of said horizontal split line.

11. An air bag mount device for mounting an air bag unit on a steering wheel device comprising:

an air bag body, which is to be inflated, in the air bag unit, an air bag cover provided in the air bag unit for covering the air bag body, a bag storing portion provided in the air bag unit for receiving the air bag body, control switch means provided in said bag storing portion, each control switch means including an operating portion located on the air bag cover for controlling accessories mounted on a vehicle, wall means for partitioning the control switch means from the air bag body, and bracket means for mounting the control switch means at opposite sides of the air bag body, wherein the air bag body is formed with a breakable split line along which the air bag cover is split to form an opening through which the air bag body expands when it is inflated.

* * * * *